No. 770,886. PATENTED SEPT. 27, 1904.
P. S. BARRETT.
CONTROLLER APPARATUS.
APPLICATION FILED FEB. 4, 1904.
NO MODEL.
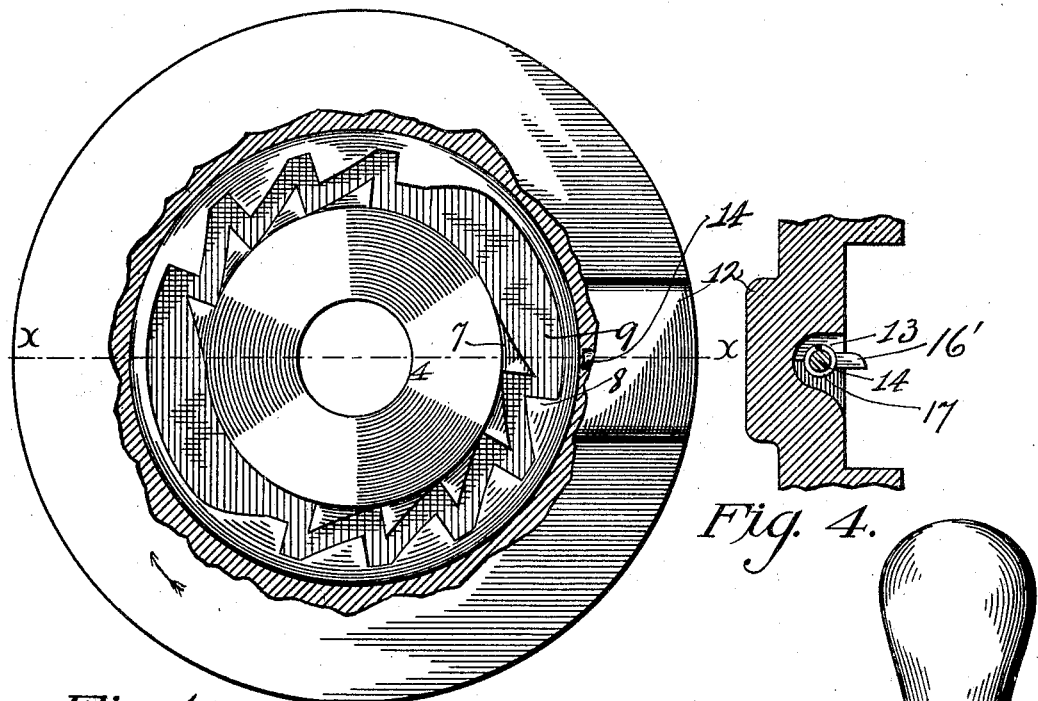
Fig. 1.
Fig. 4.
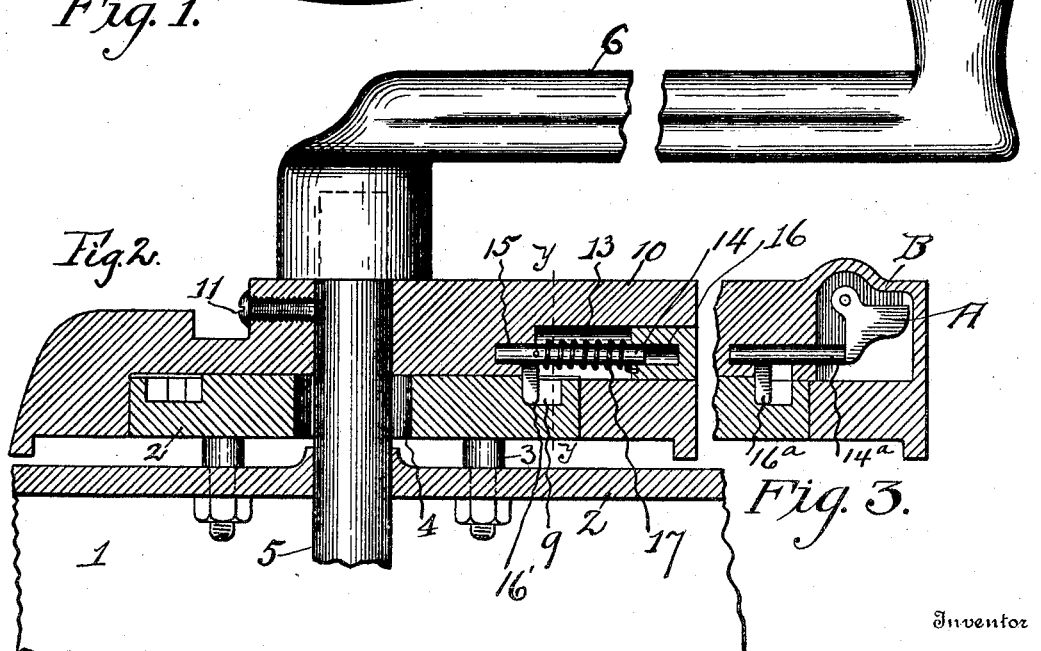
Fig. 2.
Fig. 3.
Witnesses
T. J. De Lacey
B. P. Mourning
Inventor
Patrick S. Barrett
D. B. Replogle
By Attorney

UNITED STATES PATENT OFFICE.

PATRICK S. BARRETT, OF SCRANTON, PENNSYLVANIA.

CONTROLLER APPARATUS.

SPECIFICATION forming part of Letters Patent No. 770,886, dated September 27, 1904.

Application filed February 4, 1904. Serial No. 191,976. (No model.)

*To all whom it may concern:*

Be it known that I, PATRICK S. BARRETT, a citizen of the United States, residing at Scranton, in the county of Lackawanna and State of Pennsylvania, have invented certain new and useful Improvements in Controller Apparatus, of which the following is a specification.

This invention relates to improvements to controller apparatus, and is designed particularly as an improvement on the invention contained in patent to Barrett and Durkin, No. 730,334, of June 9, 1903.

An object of this invention is to produce automatically-actuated means for periodically arresting the controller-lever in its rotation in order to prevent the too rapid movement of the said lever by the operator, it being the object of this invention to insure the gradual application of the current to the motor.

Furthermore, an object of the invention is to provide novel means for arresting and releasing the lever, the said releasing means being actuated in any suitable manner to remove the detent from the shoulders of the controller-head.

Finally, an object of the invention is to produce a controller apparatus of the character described which will possess advantages in points of efficiency, durability, and simplicity, proving at the same time comparatively inexpensive to produce and maintain.

With the foregoing and other objects in view the invention consists in the details of construction and in the arrangement and combination of parts to be hereinafter more fully set forth and specifically claimed.

In describing the invention in detail reference will be had to the accompanying drawings, forming part of this specification, wherein like characters denote corresponding parts throughout the several views, in which—

Figure 1 is a plan view of a controller-stand, showing the upper portion thereof broken away, illustrating the lever-arresting mechanism in plan. Fig. 2 is a sectional view taken on the line $x$ $x$ of Fig. 1. Fig. 3 is a fragment of a controller-head, showing a modified means for actuating the detent in one direction; and Fig. 4 is a sectional view taken on a line corresponding with the line $y$ $y$ of Fig. 2.

In the drawings, 1 denotes the controller-stand, having on its upper surface a stationary plate 2, supported thereon by means of studs 3, the said plate having a central hub 4, in which the shaft 5 of the controller-lever 6 is rotatable. The upper surface of the plate has a series of camming-teeth 7 projecting from the hub and a second series of shouldered teeth 8 projecting in a direction opposite to the teeth 7, the said teeth 7 and 8 being in stepped relation and each projecting into an annular recess or groove 9, formed in the upper surface of the said plate.

A head 10 is fastened on the shaft 5 by means of the screw 11 and is designed to rotate with the said shaft as the current is being controlled. The head 10 is provided with a boss 12, in which is formed a recess 13 for the reception of the bolt 14, the said bolt being slidable in the seats 15 and 16, formed in the said head at each end of the recess 13. The bolt 14 has a lug 16', which will be hereinafter termed a "detent," the said detent being pressed by a spring 17, and said detent lying normally against the edge of the hub 4. As the lever 6 is rotated and the head 10 is carried thereby the detent will come into engagement with the camming-surfaces of the teeth 7, and riding over said camming-surfaces would be brought into alinement with the shoulders of the teeth 8. As the lever 6 is turned rapidly, the said detent after being released by the camming-surfaces of the teeth 7 would contact with the shoulders of the teeth 8 and be temporarily arrested; but the said detents being under the tension of the spring 17 would again be thrown into engagement with the edge of the hub 4 or into contact with the camming-surface of the next succeeding tooth 7, and so the operation would continue step by step until the current was completely turned on, and by a complete rotation of the lever in the direction of the arrows shown in Fig. 1 the parts would be returned to their normal position, at which position the current would be cut out.

From an inspection of Fig. 3 it will be observed that the detent $16^a$ is mounted on a bolt $14^a$ and that the said bolt $14^a$ is normally pressed inwardly through the medium of a pivot-weight A, which weight is hung in the housing B of the head. I do not wish to be limited to the manner of pivoting or supporting the weight A, it being my purpose to utilize any mechanical means for normally holding the bolt with the detent in the position indicated herein.

In reversing the controller-lever the lug 16 is free to swing and ride over the teeth 7, the said operation being the same in this construction as that described on page 2 of the specification of the patent to Barrett and Durkin, heretofore referred to.

The construction, operation, and advantages will, it is thought, be understood from the foregoing description, it being noted that various changes may be resorted to in the proportions and details of construction for successfully carrying the invention into practice without departing from the scope thereof.

Having fully described the invention, what I claim as new, and desire to secure by Letters Patent, is—

1. In a controller of the character described, an operating-handle and a shaft, a head carried thereby, a stationary plate over which the head moves, stepped teeth alternately projecting in opposite directions, a detent carried by the head and means whereby the detent is caused to alternately engage the teeth of the stationary member.

2. In a controller of the character described, a casing, a plate stationary thereon and having an annular recess in its upper surface, teeth projecting in opposite directions into the said recess, the said teeth having alternate camming-surfaces and arresting-shoulders, a head, a detent carried by the head and means whereby the said detent is automatically caused to engage successively the camming-surfaces of the arresting-shoulders.

3. In a controller of the character described, a casing, a plate thereon having an annular recess, teeth projecting in opposite directions into the recess, one series of teeth having camming-surfaces and the other series of teeth forming arresting-shoulders, the teeth of one series alternating with respect to the teeth of the other series, a member movable over the plate, a detent slidable in the said member and depending into the recess of the stationary plate and means for causing the said detent to alternately engage the camming-surfaces of one series of teeth and the arresting-shoulders of the other series of teeth.

In testimony whereof I affix my signature, in the presence of two witnesses, this 2d day of February, 1904.

PATRICK S. BARRETT.

Witnesses:
CHAS. L. HAWLEY,
H. J. GIBBONS.